(12) United States Patent
Miyashita

(10) Patent No.: US 7,797,176 B2
(45) Date of Patent: Sep. 14, 2010

(54) RESERVATION PROCESSING METHOD AND RESERVATION PROCESSING SYSTEM

(75) Inventor: Kazuo Miyashita, Tsukuba (JP)

(73) Assignee: National Institute of Advanced Industrial Science and Technology, Ibaraki (JP)

( * ) Notice: Subject to any disclaimer, the term of this patent is extended or adjusted under 35 U.S.C. 154(b) by 855 days.

(21) Appl. No.: 11/547,307

(22) PCT Filed: Apr. 5, 2005

(86) PCT No.: PCT/JP2005/006995

§ 371 (c)(1),
(2), (4) Date: Nov. 6, 2006

(87) PCT Pub. No.: WO2005/098700

PCT Pub. Date: Oct. 20, 2005

(65) Prior Publication Data

US 2007/0271123 A1 Nov. 22, 2007

(30) Foreign Application Priority Data

Apr. 8, 2004 (JP) .............................. 2004-114625

(51) Int. Cl.
*G06Q 10/00* (2006.01)
(52) U.S. Cl. .......................................................... 705/5
(58) Field of Classification Search .................. 705/5
See application file for complete search history.

(56) References Cited

U.S. PATENT DOCUMENTS 5,797,127 A * 8/1998 Walker et al. .................. 705/5

(Continued)

FOREIGN PATENT DOCUMENTS

JP 10-283402 10/1998

(Continued)

OTHER PUBLICATIONS

Thannopoulos et al., "Ticketing of large scale events: The case of the Sydney 2000 Olympic Games", Facilities, v. 20, pp. 22-23, 2002.*

(Continued)

*Primary Examiner* — John W Hayes
*Assistant Examiner* — Kevin Flynn
(74) *Attorney, Agent, or Firm* — Wenderoth, Lind & Ponack, L.L.P.

(57) ABSTRACT

Reservation processing is achieved whereby suitable reservation prices are presented in accordance with the reservation request of a reservation seeker and the situation regarding earlier-arriving reservations, thereby enabling the reserver to reserve the product he or she desires. When the reservation server receives reservation information from the reservation terminal, it calculates discounted reservation prices based on the number of reservation alternatives designating products desired to be reserved and the reservation fixing time designating a time limit for fixing the reservation, allocates one among the reservation alternatives as a tentative provisional reservation and further allocates the other choices as tentative backup reservations. In the case where, up to the reservation fixing time, there has been a reservation request with respect to the provisional reservation allocation from a later-arriving reservation seeker at a reservation price set at a premium, the provisional reservation allocation is switched to one of the backup reservation allocations and the original provisional reservation allocation is made a reservation allocation of the later-arriving reservation seeker.

17 Claims, 8 Drawing Sheets

U.S. PATENT DOCUMENTS

| | | | |
|---|---|---|---|
| 6,302,844 B1 * | 10/2001 | Walker et al. | 600/300 |
| 2002/0072940 A1 * | 6/2002 | Keough | 705/5 |
| 2005/0216317 A1 * | 9/2005 | Medellin et al. | 705/6 |
| 2007/0208625 A1 * | 9/2007 | Walker et al. | 705/17 |

FOREIGN PATENT DOCUMENTS

| | | |
|---|---|---|
| JP | 2001-243288 | 9/2001 |
| JP | 2002-092438 | 3/2002 |
| JP | 2002-150086 | 5/2002 |
| JP | 2002-169939 | 6/2002 |
| JP | 2002-183566 | 6/2002 |
| JP | 2004-54717 | 2/2004 |
| WO | 01/63504 | 8/2001 |

OTHER PUBLICATIONS

Notification of Reasons for Refusal (with English translation) cited in Japanese Office Action dated Mar. 17, 2009 in Japanese Patent Application No. 2006-512148.

* cited by examiner

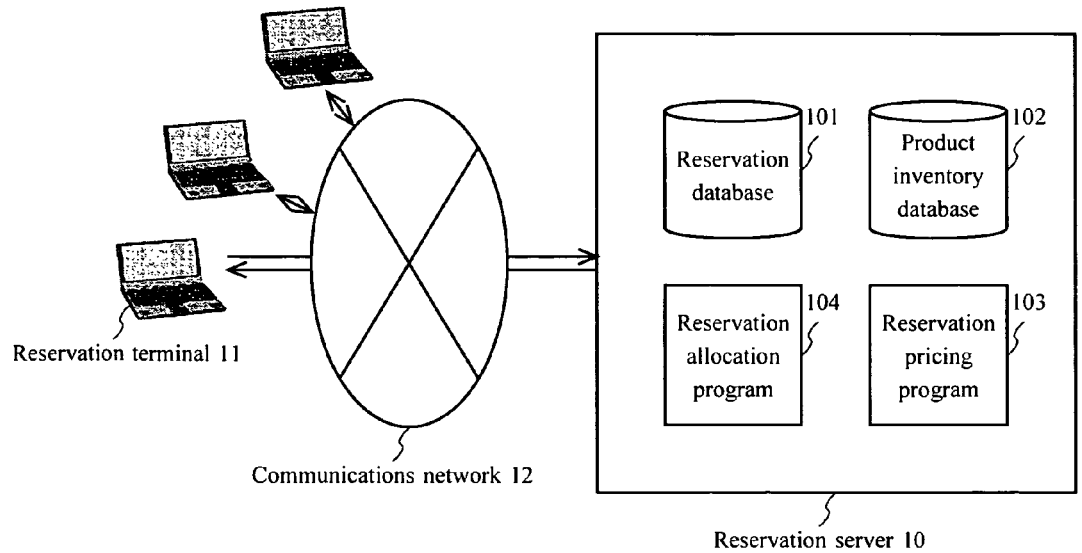

Fig.1

```
                                          20
                                         ↙
┌─────────────────────────────────────────┐
│ Reservation alternatives                │  21
│   March 12, Single,  No smoking, One room │ ↙
│   March 12, Double,  No smoking, One room │
│   March 12, Single,  Smoking,    One room │
│   March 13, Twin,    No smoking, One room │  22
│ Reservation fixing time                 │ ↙
│   March 5                               │
│                                         │  23
│ Reservation registration time           │ ↙
│   March 1                               │
└─────────────────────────────────────────┘
```

Fig.2

| | | | | | | | | 100 |
|---|---|---|---|---|---|---|---|---|

Document      _ □ ×

File(F)   Edit(E)   View(V)   Favorites(A)   Tools(T)   Help(H)

General User Home

Enter Date and No. of Guests

Room search. Select hotel or location and designate check-in date and number of guests.

---

| Target | Please select one | | 91 |
|---|---|---|---|
| | By hotel name ▽    By location ▽ | | |
| Room type | ☑ Single    ☑ Twin | | |
| Check-in date | Year 2005 ▽ Month 2 ▽ Day 21 ▽ | | |
| Nights | 1 ▽ Nights | | |
| No. of rooms | 1 ▽ Rooms | | |
| No. of guests | 1 ▽ Guests | | |
| Price range | No lower limit ▽ Yen ~ No upper limit ▽ Yen | | |

[ Search ]—92

---

[ List rooms ]

[ Log out ]

Page displayed        Internet

Fig.9

| | | | | | | |
|---|---|---|---|---|---|---|
| | Enter search options | | Search results | | Reserve | |
| | | | Search results | | | |

Search results

| Designated reservation | Discounted reservation |
|---|---|

Six matching rooms were found.

| Hotel | Room type | Length of stay | Designated reservation price | Regular price | Reservation |
|---|---|---|---|---|---|
| Hotel C | Single | 2005/4/21~2005/4/22 | 4,800 | 6,000 | Reserve |
| A Hotel | Single A | 2005/4/21~2005/4/22 | 5,000 | 8,000 | Reserve |
| B Hotel | Single A | 2005/4/21~2005/4/22 | 8,000 | 7,000 | Reserve |
| A Hotel | Twin | 2005/4/21~2005/4/22 | 6,390 | 10,000 | Reserve |
| B Hotel | Twin B | 2005/4/21~2005/4/22 | 7,200 | 9,000 | Reserve |
| Hotel C | Twin | 2005/4/21~2005/4/22 | 8,400 | 12,000 | Reserve |

| Target | Please select one |
|---|---|
| | By hotel name ▽    By location ▽ |
| Room type | ☑ Single   ☑ Twin |
| Check-in date | Year 2005 ▽ Month 2 ▽ Day 21 ▽ |
| Nights | 1 ▽ Nights |
| No. of rooms | 1 ▽ Rooms |
| No. of guests | 1 ▽ Guests |
| Price range | No lower limit ▽ Yen ~ No upper limit ▽ Yen |

Search

Home

Fig.10

| Document | _ □ ☒ |
|---|---|

File(F)  Edit(E)  View(V)  Favorites(A)  Tools(T)  Help(H)

| Enter search options | Search results | Reserve |
|---|---|---|
| | | * * * * > Preference order > Confirm > Reserved |

Selection of discounted reservation alternatives  112

| Designated reservation | Discounted reservation |
|---|---|

111 List of selected rooms ( 4 currentry selected )   115

| Hotel | Room type | Length of stay | Discounted provisional reservation price | Designated reservation price | Regular price | Cancellation |
|---|---|---|---|---|---|---|
| Hotel C | Single | 2005/4/21~2005/4/22 | 4,800 | 4,800 | 6,000 | Cancel |
| A Hotel | Single A | 2005/4/21~2005/4/22 | 5,000 | 5,000 | 8,000 | Cancel |
| A Hotel | Twin | 2005/4/21~2005/4/22 | 6,390 | 6,390 | 10,000 | Cancel |

117

List of unselected rooms ( 2 currentry unselected )   116

| Hotel | Room type | Length of stay | Discounted provisional reservation price | Designated reservation price | Regular price | Selection |
|---|---|---|---|---|---|---|
| B Hotel | Twin B | 2005/4/21~2005/4/22 | 7,200 | 7,200 | 9,000 | Select |
| Hotel C | Twin | 2005/4/21~2005/4/22 | 8,400 | 8,400 | 12,000 | Select |

118

119

| Change reservation finalization data | Year | 2005 ▽ | Month | 2 ▽ | Day | 21 ▽ 日 | Change |

※Please select reservation fixing data between 2005/2/21 and 2005/4/20

| Select preference order | ─121

| Discounted reservation | ─122

- - - - - - - - - - - - - - - - - - - - - - - - - - - - - - - - - - - - - -

| Home |

Page displayed                                              Internet

Fig.11

RESERVATION PROCESSING METHOD AND RESERVATION PROCESSING SYSTEM

BACKGROUND OF THE INVENTION

I. Technical Field

This invention relates to a method and system for processing reservations for use and purchase of all kinds of products, including facility use and ticket purchases.

II. Description of the Related Art

Numerous proposals have been made in the past regarding reservation processing methods and reservation processing systems that use a computer for conducting reservation-based sales of facility use rights, tickets and the like.

Moreover, as wide-area communications networks, typically the Internet, have spread and grown faster in recent years, and the number of occasions on which people use reservation systems directly for purchasing products has increased, so that many reservation systems have been developed in pursuit of ease of use and convenience for the general user.

Further, reservation processing techniques include ones aimed at maximizing profit through reservation-based sales by suitably adjusting product prices up and down in accordance with reservation conditions (i.e., applying the economic principle of lowering the price of items for which demand is scare and increasing the price of items for which demand is huge), thereby avoiding concentration of reservation seekers on certain kinds of reservations, and with regard to these, research has from the past been conducted concerning automatic prices setting techniques, in the issue of Revenue Management/Yield Management, and many proposals have been made in the past as typified by the air ticket reservation systems of US airline companies.

The teachings set out in the following references, for example, are of interest regarding such past reservation processing techniques and reservation processing systems.

1) Unexamined Japanese Patent Application JP-A-2002-117210
2) Unexamined Japanese Patent Application JP-A-2003-256702
3) Unexamined Japanese Patent Application JP-A-2003-256703
4) Unexamined Japanese Patent Application JP-A-2001-331657
5) Unexamined Japanese Patent Application JP-A-2002-109337

SUMMARY OF THE INVENTION

Now in many cases reservation seekers can efficiently reserve products that satisfy their desires by using a reservation system.

With most conventional reservation systems, however, the reservation seeker is required to univocally designate the desired reservation and, for instance, cannot make a reservation request ambiguously in the manner of either A or B will do. As a result, the reservation seeker using such a reservation system is burdened with decision-making, designation and other tasks that are unnecessary for his or her original reservation purposes.

Further, in the conventional reservation systems, information on the reservation seekers' reservation alternatives is not effectively utilized and reservations are allocated to reservation seekers on a first-come first-served basis and, therefore, when many reservation seekers concentrate on a particular product, if the product on which the reservation seekers have concentrated is first designated for a reservation for an earlier-arriving reservation seeker who, at heart, has many other reservation alternatives, then that product will inevitably be allocated to the earlier-arriving reserver, so that when the number of other reservation alternatives of later-arriving reservation seekers is few, the possibility cannot be avoided of the later-arriving reservation seekers being totally unable to make the reservations they desire.

That is, since reservations are allocated to reservation seekers in the order of arrival using the order of arrival at the reservation system as the sole decision criterion without regard to the remaining inventory or number of reservation alternatives of the products that reservation seekers want, it is difficult for the business operator offering the products to retroactively adjust for reservation demand unbalances so as to carry out the most effective distribution with respect to the reservation seekers desiring products.

It is, however, possible for the business operator offering the products to reduce the concentration of reservations on specific products by indirectly influencing reservation seekers through dynamic reservation price adjustments.

But even in such a reservation system that suitably raises and lowers reservation prices, the fact that reservations are preferentially allocated to reservation seekers in the order of arrival at the reservation system means that if the earlier-arriving reservation seekers are allowed the reservation prices set by the reservation system, scarce products (i.e., popular ones with little remaining inventory) will be snatched up early even though the earlier-arriving reservation seekers may have many reservation alternatives. As a result, it may be impossible to avoid the possibility of later-arriving reservation seekers not being able to reserve the products they want at all even if they have high budgets (also called "reservation prices"), so that the business operator offering reservations will miss the chance to gain the more profits it should be able to realize.

Conventionally, attempts have been made to solve this problem by accurately forecasting the distribution of reservation seeker's reservation prices and arrival times.

However, since it is generally very difficult to forecast reservation seeker's behavior accurately, practical implementation of such highly sophisticated reservation techniques has been attempted only in particular industries that have accumulated huge amounts of data regarding reservers in the past (e.g., the airlines industry etc.), so that other industries newly adopting such techniques would be required to bear a great burden in terms of time and expense.

Further, regarding the point of reservation price adjustment, recent years have seen the appearance of reservation systems that apply the auction principle, in which the reservation seeker bids an appropriate amount of consideration for a desired product, whereby the desired product can be reserved at the desired price matched to the scarcity of the product.

However, in an auction, in which there is the possibility of not winning the bid, it is uncertain for reservation seekers at the time of bidding whether the desired reservation can be acquired, which poses the problem that it is not possible to respond to the needs of reservation seekers who want to use the reservation system to secure a reservation without fail.

Thus, most reservation systems in their current condition are disadvantageous to the reservation seeker in that the desired product cannot be simply and reliably reserved, while, moreover, they are also likely to be disadvantageous to the business operator offering product reservations, because sellout or dead stock may occur owing to inadequate adjustment of supply and demand, which means loss of the opportunity to sell products that should have been salable through reservations.

The object of the present invention is therefore is to provide a reservation processing method and a reservation processing system which, in a case where a plurality of reservation alternatives satisfying the reservation conditions of earlier-arriving reservers exist but the situation is such that later-arriving reservation seekers would conventionally not be able to acquire the reservations they desire, enables the later-arriving reservation seekers to reserve desired products by swapping and adjusting reservations of the earlier-arriving reservers within the scope of the reservation alternatives.

Further, another object of the present invention is to provide a reservation processing method and a reservation processing system which, in a case where reservation seekers have a plurality of reservation alternatives, do not require selection of only one thereamong for reservation at the time of making a reservation but rather allow designation of a plurality of reservation alternatives and a reservation fixing time limit, thereby enabling sure acquisition of one reservation while enjoying a discounted reservation price.

In addition, another object of the present invention is to provide a reservation processing method and a reservation processing system which, for a business operator offering products for sale by reservation, can, for enabling realization of greater profit, conduct suitable reservation price setting, including price discounts for reservers having multiple reservation alternatives, price increases when later-arriving reservation seekers want products that are already tentative reservations of earlier-arriving reservers, and the like, while also reducing early sellout of reservations for specific products, missed opportunities to sell at higher prices and incurrence of loss caused by unsold stocks.

The present invention is a reservation processing system equipped with a reservation terminal for accepting and transmitting reservation information on a product purchase reservation from a reservation seeker and a reservation server for conducting reservation acceptance processing based on the reservation information received from the reservation terminal, the reservation terminal having a function to accept and transmit to the reservation server reservation seeker-input reservation information containing a plurality of reservation alternatives designating products desired to be reserved and a reservation fixing time that designates a time limit for fixing the reservation, and the reservation server having a reservation allocation function to, based on the reservation information received from the reservation terminal, allocate one among the reservation alternatives as a provisional reservation that is a tentative reservation, allocate/manage the remaining reservation alternatives as backup reservations that are auxiliary tentative reservations, and on condition that later-arriving reservation information received up to the reservation fixing time meets a predetermined condition (acceptance of premium price, registration as special member or the like), to respond thereto by allocating the provisionally reserved product as a reservation with respect to the later-arriving reservation information and changing one of backup reservations to the provisional reservation.

Therefore, owing to the provisional reservation being made based on the earlier-arriving reservation information, the provisional reservation can be reserved/allocated to the later-arriving reservation information. As a result, owing to the acceptance of reservation information having ambiguity in the sense of accepting alternative products for reservation to be fixed, the probability of being able to allocate a reservation to later-arriving reservation information increases.

In the reservation processing system of the present invention, which among the plurality of reservation alternatives contained in the reservation information with ambiguity is to be allocated as the provisional reservation can, for example, be decided by having the reservation server automatically make a selection on a criterion of, for instance, giving priority to a product choice of low popularity, but, in order to reflect the desire of the reservation seeker, the reservation server preferably allocates the highest priority choice among the reservation alternatives as the provisional reservation, in accordance with the reservation seeker's choice priority assignment contained in the received reservation information.

Further, in the reservation processing system of the present invention, the reservation server preferably has a reservation pricing function to calculate, with respect to reservation information for a provisional reservation, a discounted reservation price in accordance with the number of reservation alternatives contained in the reservation information and/or the time allowance up to the reservation fixing time contained in the reservation information.

As a result, the reservation seeker can be motivated to make a provisional reservation and, moreover, be motivated to increase ambiguity based on the number of reservation alternatives in the provisional reservation and the time allowance up to reservation fixing, and from the viewpoint of the business operator, it becomes possible to utilize the ambiguity of the reservation to accept reservations from many reservation seekers.

Further, in the reservation processing system of the present invention, preferably, the reservation pricing function calculates a premium reservation price with respect to the later-arriving reservation information and the reservation allocation function, taking the fact that the premium reservation price was accepted by the reservation seeker who input the later-arriving reservation information to mean that the predetermined condition has been met, allocates the provisional reservation with respect to the earlier-arriving reservation information to a reserved product with respect to the later-arriving reservation information and changes one of backup reservations to the provisional reservation.

As a result, the reservation processing giving priority to the later-arriving reservation can be balanced with respect to the earlier-arriving provisional reservation by price.

Note that while the premium reservation price is typically made a higher price than a certain standard reservation price, it can be a price lower than the standard reservation price insofar as it is a higher price than that of an ordinary reservation or provisional reservation and even such a premium reservation price can be differentiated in price with respect to an ordinary reservation or provisional reservation.

Further, the fact of being a special member can, for instance, be established as the predetermined condition for preferentially allocating a reservation to the later-arriving reservation information, thereby configuring a membership reservation processing system that preferentially accepts even later-arriving reservations from special members, and various conditions can be established as said condition.

More specifically, the present invention is a reservation processing system that conducts processing based on reservation information received from a reservation terminal for allocating one among the reservation alternatives contained in the reservation information as a provisional reservation that is a tentative reservation and further allocating the remaining reservation alternatives as backup reservations that are auxiliary tentative reservations, which reservation processing system is characterized in comprising: a product inventory database for managing the suppliable quantity of products offered by the business operator and the demanded quantity of products allocated to reservation seekers; a plurality of reservation terminals for accepting input of and transmitting reservation information containing a plurality of reservation alternatives designating products that reservation seekers desire to reserve and reservation fixing times that designate time limits for fixing the reservations; a reservation database for tabulating reservation alternatives of the reservation information transmitted from the plurality of reservation terminals; reservation pricing means for, based on the reservation information, calculating with respect to product prices established in view of the demanded quantity and the suppliable quantity of the products discounted reservation prices with regard to the reservation information for the provisional reservations in accordance with the number of reservation alternatives and the time allowance up to reservation fixing and, with respect to later-arriving reservation information received up to the reservation fixing times, calculating premium reservation prices for cases where the provisionally reserved products are allocated as reservations with respect to the later-arriving reservation information; and reservation allocation means for transmitting the calculated reservation prices back to the reservation terminals that transmitted reservation information and, in a case where acceptance of the reservation price is obtained in response, fixing the reservation allocation if the number of reservation alternatives that can be reserved is one, allocating a provisional reservation to one of the reservation alternatives and allocating backup reservations to the other reservation alternatives if the number thereof that can be reserved is greater than one, and, in a case where there was, by the reservation fixing time, a reservation request made by a later-arriving reservation seeker at the premium reservation price established by the reservation pricing means, then, with respect to the provisional reservation allocation, replacing the provisional reservation with one of the backup reservations provided that a reservable backup reservation exists, making the original provisional reservation a reservation of the later-arriving reservation seeker, and when the desired reservation fixing time arrives making the provisional reservation a fixed reservation with respect to the reservation seeker.

Further, the present invention is a reservation server that receives reservation information input by a reservation seeker that contains a plurality of reservation alternatives designating products desired to be reserved and a reservation fixing time that designates a time limit for fixing the reservation, and conducts reservation acceptance processing, which reservation server is characterized in having a reservation allocation function that, based on the received reservation information, allocates one among the reservation alternatives as a provisional reservation that is a tentative reservation, allocates/manages the remaining reservation alternatives as backup reservations that are auxiliary tentative reservations, and on condition that later-arriving reservation information received up to the reservation fixing time meets a predetermined condition, responds thereto by allocating the provisionally reserved product as a reservation with respect to the later-arriving reservation information and changes one of backup reservations to the provisional reservation.

Further, the present invention is a reservation terminal for constituting a reservation processing system together with a reservation server that has a reservation allocation function to, based on received reservation information, allocate one among reservation alternatives as a provisional reservation that is a tentative reservation, allocate/manage the remaining reservation alternatives to backup reservations that are auxiliary tentative reservations, and on condition that later-arriving reservation information received up to the reservation fixing time meets a predetermined condition, respond thereto by allocating the provisionally reserved product as a reservation with respect to the later-arriving reservation information and changing one of backup reservations to the provisional reservation, which reservation terminal is characterized in having a function to accept and transmit to the reservation server reservation information input by a reservation seeker that contains a plurality of reservation alternatives designating products desired to be reserved and a reservation fixing time that designates a time limit for fixing the reservation.

Further, the present invention is a program for by use of a computer configuring a reservation server that receives reservation information input by a reservation seeker that contains a plurality of reservation alternatives designating products desired to be reserved and a reservation fixing time that designates a time limit for fixing the reservation, and conducts reservation acceptance processing, which program is characterized in that execution thereof by the computer of the reservation server creates in the computer a reservation allocation function to, based on received reservation information, allocate one among reservation alternatives as a provisional reservation that is a tentative reservation, allocate/manage the remaining reservation alternatives as backup reservations that are auxiliary tentative reservations, and on condition that later-arriving reservation information received up to the reservation fixing time meets a predetermined condition, respond thereto by allocating the provisionally reserved product as a reservation with respect to the later-arriving reservation information and changing one of backup reservations to the provisional reservation.

Further, the program according to the present invention is a program additionally characterized in that execution thereof by the computer of the server creates in the computer a reservation pricing function to calculate, with respect to reservation information allocated under a provisional reservation, a discounted reservation price in accordance with the number of reservation alternatives contained in the reservation information and/or in accordance with the time allowance up to the reservation fixing time contained in the reservation information.

Further, the program according to the present invention is a program additionally characterized in that the reservation pricing function calculates a premium reservation price with respect to later-arriving reservation information and the reservation allocation function, taking the fact that the premium reservation price was accepted by the reservation seeker who input the later-arriving reservation information to mean that the predetermined condition has been met, allocates the provisionally reserved product as a reservation with respect to the later-arriving reservation information and changes one of backup reservations to the provisional reservation.

Further, this invention is a reservation processing method implemented by a reservation processing system equipped with a reservation terminal for accepting and transmitting the reservation information on a product purchase reservation from a reservation seeker and a reservation server for conducting reservation acceptance processing based on the reservation information received from the reservation terminal, which reservation processing method is characterized in that the reservation terminal accepts and transmits to the reservation server reservation seeker-input reservation information containing a plurality of reservation alternatives designating products desired to be reserved and a reservation fixing time that designates a time limit for fixing the reservation, and the reservation server allocates, based on the reservation information received from the reservation terminal, one among the reservation alternatives as a provisional reservation that is a tentative reservation, allocates/manages the remaining reservation alternatives as backup reservations that are auxiliary tentative reservations, and on condition that later-arriving reservation information received up to the reservation fixing time meets a predetermined condition, responds thereto by allocating the provisionally reserved product as a reservation with respect to the later-arriving reservation information and changes one of backup reservations to the provisional reservation.

Further, the reservation processing method according to the present invention is a reservation processing method additionally characterized in that, with respect to reservation information for a provisional reservation, the reservation server calculates a discounted reservation price in accordance with the number of reservation alternatives contained in the reservation information and/or in accordance with the time allowance up to the reservation fixing time contained in the reservation information.

Further, the reservation processing method according to the present invention is a reservation processing method additionally characterized in that the reservation server calculates a premium reservation price with respect to later-arriving reservation information and, taking the fact that the premium reservation price was accepted by the reservation seeker who input the later-arriving reservation information to mean that the predetermined condition has been met, allocates the provisional reservation with respect to the earlier-arriving reservation information to a reserved product with respect to the later-arriving reservation information and changes one of backup reservations to the provisional reservation.

Further, the reservation processing method according to the present invention is a reservation processing method that, in a reservation system comprising, in interconnection with a communications network, a plurality of reservation terminals, a product inventory database, a reservation database and a reservation server having reservation pricing means and reservation allocation means, is implemented to conduct processing for, based on reservation information received from the reservation terminals, allocating one among the reservation alternatives contained in the reservation information as a provisional reservation that is a tentative reservation and further allocating the remaining reservation alternatives as backup reservations that are auxiliary tentative reservations, which reservation processing method is characterized in that it conducts processing whereby: the product inventory database manages the suppliable quantity of products offered by the business operator and the demanded quantity of products allocated to reservation seekers; upon the reservation allocation means having received via the communications network reservation information transmitted from the plurality of reservation terminals and containing reservation alternatives designating products that reservation seekers desire to reserve and reservation fixing times that designate time limits for fixing the reservations, the reservation database tabulates reservation alternatives of the reservation information transmitted from the plurality of reservation terminals; based on the reservation alternatives of the reservation information, the reservation pricing means calculates with respect to product prices suitably established in view of the demanded quantity and the suppliable quantity of the products discounted reservation prices with regard to the reservation information for the provisional reservations in accordance with the number of reservation alternatives and the time allowance up to reservation fixing and, with respect to later-arriving reservation information received up to the reservation fixing times, calculates premium reservation prices for cases where the provisionally reserved products are allocated as reservations with respect to the later-arriving reservation information; and the reservation allocation means transmits the calculated reservation prices back to the reservation terminals that transmitted reservation information and, in a case where acceptance of the reservation price is obtained in response, fixes the reservation allocation if the number of reservation alternatives that can be reserved is one, allocates a provisional reservation to one of the reservation alternatives and allocates backup reservations to the other reservation alternatives if the number thereof that can be reserved is greater than one, and, in a case where there was, by the reservation fixing time, a reservation request made by a later-arriving reservation seeker at the premium reservation price established by the reservation pricing means, then, with respect to the provisional reservation, replaces the provisional reservation with one of the backup reservations provided that a reservable backup reservation exists, makes the original provisional reservation a reservation allocation of the later-arriving reservation seeker, and when the desired reservation time arrives makes the provisional reservation a fixed reservation allocation with respect to the reservation seeker.

In accordance with the present invention, the provisional reservation is made based on the earlier-arriving reservation information, and the provisionally reserved product can be reserved/allocated to the later-arriving reservation information, so that, by accepting ambiguous reservation information in the sense of accepting alternative products among which reservation is fixed, the probability of being able to allocate a reservation to later-arriving reservation information increases.

In accordance with the present invention, processing is conducted whereby, in a case where reservation seekers have a plurality of reservation alternatives, discounted reservation prices are calculated with respect to the reservation prices of the products established by the business operator in view of the demanded quantity and the suppliable quantity of the products, with consideration to the number of reservation alternatives and the time allowance up to the reservation fixing time, the calculated reservation prices of the products are sent back to the reservation terminals that transmitted the reservation information, in a case where data confirming the reservation price is obtained in response, the reservation allocation is fixed if the number of reservation alternatives that can be reserved is one, a provisional reservation is allocated to one of the reservation alternatives and backup reservations are allocated to the other reservation alternatives if the number thereof that can be reserved is greater than one, and, in a case where there was, by the reservation fixing time, a reservation request made by a later-arriving reservation seeker at the premium reservation price established by the reservation pricing means, then, the provisional reservation is switched to one of the backup reservations provided that a reservable backup reservation exists, the original provisional reservation is made a reservation of the later-arriving reservation seeker, and when the desired reservation fixing time arrives the provisional reservation is at that time made a fixed reservation with respect to the reservation seeker. Further, in the case where a reservation seeker wants a product already reserved by an earlier-arriving reserver, the reservation pricing means further calculates a premium reservation price with respect to the reservation price of the product established by the business operator in view of the demanded quantity and the suppliable quantity of the product, sends the calculated reservation price of the product back to the reservation terminal that transmitted the reservation information, in the case where data confirming the reservation price is obtained in response, replaces the provisional reservation of the earlier-arriving reserver with one of the backup reservations and makes the original provisional reservation a reservation of the later-arriving reservation seeker. Thus the reservation of the product concerned is allocated to the reservation seeker who most requires the product, at the calculated suitable reservation price. As a result, the reservation seekers can, to the utmost possible, be provided with reservations for the products that are their first picks among the product choices, and for the business operator offering products by reservation, greater profit can be realized by reducing loss of early sellout and unsold stock caused by concentration of reservations on specific products.

Further, in accordance with the present invention, the information regarding the product reservation alternatives of the reservation seeker desiring reservations is tabulated and the suitable reservation prices of the products established by the business operator are dynamically calculated moment to moment in view of the balance between the demanded quantity and the suppliable quantity of the products. When selling a plurality of products by reservation, if uneven demand distribution among the individual products results in a mixture of products on which desire for reservations concentrates and products likely to remain as dead stock, the business operator can set suitable prices with respect to the reservation seeker in accordance with the remaining inventory of products and further discount reservation prices with respect to the reservation seeker in accordance with the number of reservation alternatives for which reservation replacement is possible and the time allowance up to the reservation finalization, whereby the reservation seekers can make reservations within the scope of their preferences at lower prices. Further, even in a case where later-arriving reservers want to reserve the products all of which were allocated as provisional reservations to earlier-arriving reservers, a later-arriving reservation seeker can, in a case where replaceable backup reservations exist for the earlier-arriving reservers, reserve a desired product upon payment of a premium price set by the reservation system, by replacing the provisional reservation of an earlier-arriving reserver to one of the backup reservations. In addition, in such circumstances, the business operator offering the products can, by carrying out price setting in accordance with the remaining inventory of products, maximize profits and mitigate concentration of reservation requests on specific products, and can also make indirect adjustment so as to even out the load (reservation requests) on the products within the range of the reservation alternatives and reservation allowance times set by the reservation seekers, whereby loss owing to sellout and leftover stock can be eliminated.

BRIEF DESCRIPTION OF THE DRAWINGS

FIG. 1 is a diagram showing the configuration of the principal part of an optimum online reservation system according to an embodiment of the present invention.

FIG. 2 is diagram for explaining the data structure of desired reservation information.

FIG. 9 is a diagram for explaining an example of reservation terminal screen display.

FIG. 10 is a diagram for explaining an example of reservation terminal screen display.

FIG. 11 is a diagram for explaining an example of reservation terminal screen display.

DETAILED DESCRIPTION OF THE INVENTION

Figure 3:
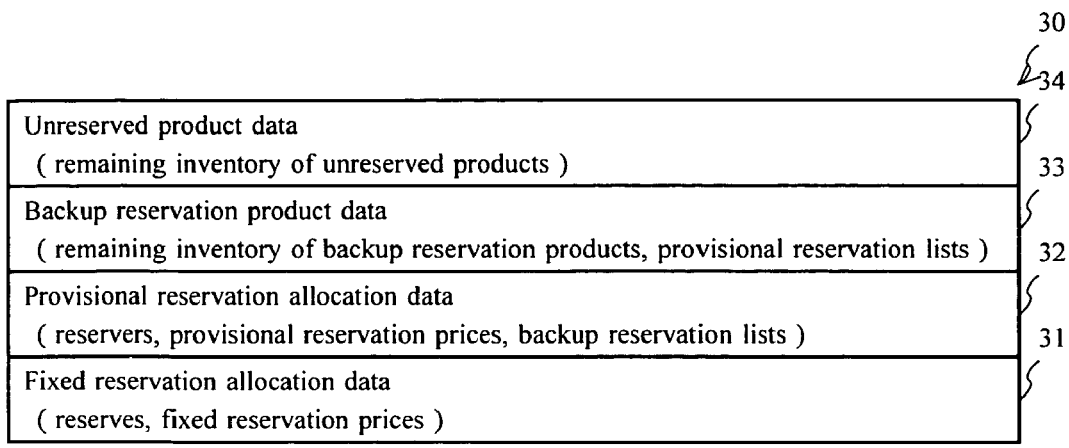
FIG. 3 is a diagram for explaining the data structure of product inventory information stored in a product inventory database.

An embodiment in the case of implementing the present invention will be explained with reference to the drawings in the following.

FIG. 1 is a diagram showing the configuration of the principal part of an online reservation system according to an embodiment of the present invention.

In FIG. 1, 10 is a reservation server, 11 is a reservation terminal, and 12 is a communications network such as the Internet, a LAN or a telephone circuit for interconnecting a plurality of reservation terminals 11 and the reservation server 10.

The reservation server 10 has a reservation database 101, product inventory database 102, a reservation pricing processing unit 103 and a reservation allocation processing unit 104, the reservation server 10 of this embodiment being constituted of a computer, and the reservation pricing processing unit 103 and reservation allocation processing unit 104, which are key functional means of the present invention, being constituted by the computer executing a program according to the present invention.

In the online reservation system, the reservation server 10 operated by a business operator engaged in reservation-based sales of products that lose their value after a time limit (e.g., a right to stay at a hotel, a right to use a tennis court or other such right to use a facility for a certain time, or a theater or other ticket valid for a specified day and time) is interconnected with the reservation terminals 11 used by reservers who want to reserve products via a telephone circuit, the Internet or other such communications network 12.

As illustrated, the reservation server 10 is equipped with, as its key functional means, the reservation database 101, product inventory database 102, reservation pricing processing unit 103 and reservation allocation processing unit 104, and as additional secondary functions that are not shown, is equipped with a control processor for controlling the system components, a communications controller for carrying out communication through the communications network 12, and the like.

Further, although the reservation terminal 11 can be a terminal provided with dedicated functions for the online reservation system, it does not have to be a terminal provided with such dedicated functions but can be any of various types of electronic equipments in so far as it has the general computing functions, communications functions and data display/input functions (e.g., GUI) of, for example, a personal computer, PDA, mobile telephone or the like.

The reservation database 101 accumulates and saves desired reservation information input by the individual reservers up to the current time. The desired reservation information here contains reservation information, which reservation information contains at least the time when the reservation was entered (reservation registration time), list of product reservation choices (reservation alternatives), and time limit for fixing the reservation (reservation fixing time).

Note that regarding the list of product reservation choices, the business operator conducting the reservation-based sales can set an appropriate upper limit on the number of reservation alternatives, so that desired reservation information containing a list of reservation choices exceeding the upper limit is not accepted by the reservation server 10. The acceptance processing that constrains the desired reservation information by these conditions can be performed by the control processor, which is not shown in the drawing.

FIG. 2 is a diagram for explaining the data structure of desired reservation information.

As shown in FIG. 2, the data structure of the desired reservation information 20 saved in the reservation database 101 includes a reservation alternative field 21, a reservation fixing time field 22 and a reservation registration time field 23. That is, in FIG. 2 taking hotel reservations as an example, "March 12, Single, No smoking, One room," "March 12, Double, Nonsmoking, One room," "March 12, Single, Smoking, One room" and "March 13, Twin, Nonsmoking, One room" are recorded as four reservation alternatives, "March 5" is recorded as the reservation fixing time for the reservations, and "March 1" is recorded as the reservation registration time for the reservations.

Note that as the reservation fixing time and reservation registration time, it is possible to record either the date or the date and time of day. Further, it is possible to have additional fields in the desired reservation information 20 for recording optional information.

The particulars of the reservation alternatives recorded in the reservation alternative field 21 are listed in the order of the most preferred choices of the reservers, to include such information as the date (use or purchase date; for a hotel, the check-in date), information specifying the product desired to be reserved (product type information; for a hotel, room type), and quantity desired to be reserved (for a hotel, the number of rooms).

In the reservation fixing time field 22 is designated the time limit (reservation fixing time) by which the reservation seeker wants the reservation to be fixed. In the case where the reservation seeker designates no particular reservation fixing time, the reservation server 10 sets it to the reservation acceptance time limit (reservation acceptance deadline) as the default time but the reservation seeker can set it to any desired time falling later than the reservation registration time and earlier than the reservation acceptance deadline.

In the reservation registration time field 23, the reservation server 10 designates the time when the reservation seeker entered the reservation request in the reservation system.

As explained later, the reason for having the reservation seeker designate a reservation fixing time is that at the time the reservation seeker applies to the reservation server 10 for a reservation, the reservation system 10 does not give the reservation seeker a real-time decision on the reservation (i.e., on the product among the reservation alternatives to be actually sold to the reservation seeker) but allocates one reservable reservation alternative as a provisional reservation up to the time limit that the reservation seeker can allow (reservation fixing time) and temporarily allocates the other reservable reservation alternatives as backup reservations, so that if between then and the designated reservation fixing time a later-arriving reservation seeker desires to reserve the provisionally reserved product even if by paying a higher price, the reservation system can reserve the product concerned for the later-arriving reservation seeker by replacing the provisional reservation of the earlier-arriving reserver with one of the backup reservations.

In such a manner, when the reservation server 10 receives the desired reservation information sent by the reservation seeker from the reservation terminal 11, it uses the desired reservation information as the basis for defining a plurality of reservation alternatives in the reservation alternative field 21 and defining a time following the reservation registration time as the reservation fixing time in the reservation fixing time field 22, whereby the probability of the reservation system also being able to make a reservation satisfying a reservation request of a later-arriving reservation seeker can be increased.

Further, as explained later, by discounting the reservation price for a reservation seeker in accordance with the number of reservation alternatives and the time allowance up to the reservation fixing time, the reservation system can give the reservation seeker an incentive to actively define a large number of reservation alternatives or define a longer reservation fixing time, thereby further increasing the probability of adjustment/replacement vis-à-vis reservations of later-arriving reservation seekers.

Further, when the reservation seeker desires to be certain of reserving a product as high as possible on the list of reservation alternatives recorded in the reservation alternative field 21, this can be achieved by defining the reservation fixing time to the same time as the reservation registration time, and by defining it in this manner, the desired reservation at the reservation registration time can be fixed in real time without fail.

The product inventory database 102 stores data on product inventory information for managing product inventory and reservation allocation. This data on the product inventory information is data for managing information for identifying products (type, number, date of use, etc.) already allocated as reservations (i.e., for which reservations have been fixed) in association with reservation seekers up to the current time, information for identifying products tentatively allocated as provisional reservations, information for identifying products allocated as backup reservation that is auxiliary reservation for the provisional reservations, and information for identifying remaining products still not allocated as reservations.

FIG. 3 is a diagram for explaining the data structure of product inventory information stored in the product inventory database 102.

As shown in FIG. 3, the data structure of the product inventory information 30 includes fixed reservation allocation data 31, provisional reservation allocation data 32, backup reservation product data 33, and unreserved product data 34.

Note that the fixed reservation allocation data 31, provisional reservation allocation data 32, backup reservation product data 33 and unreserved product data 34 data fields contain information identifying individual products under reservations associated with the reservation seekers but that the data fields can be either physically constituted or logically constituted in the memory space constituting the product inventory database 102.

The fixed reservation allocation data 31 of the product inventory information 30 stores information regarding product reservations allocated with respect to reservation seekers specified by the reservation allocation processing unit 104.

The contents of this information are recorded information identifying reserved products, information regarding reservation seeker allocated product reservations, and information regarding fixed reservation prices decided by the reservation pricing processing unit 103 (amount to be billed for the products under the fixed reservations). In the case of a hotel reservation, for instance, the recorded information is information identifying the reserved product, such as the name of the hotel, room type, check-in date and number of rooms, information regarding the reservation seeker, such as the name and contact address of the reservation seeker, and information on the fixed reservation price such as the accommodation charge.

In the provisional reservation allocation data 32 of the product inventory information 30 there is recorded information regarding the reservations that the reservation allocation processing unit 104 provisionally allocates to meet the reservation requests of reservers in the time zone from the time when the reservation seekers enter reservations up to the reservation fixing times.

The contents of this information are recorded information identifying the provisionally reserved products, information relating to the reservation seekers to whom provisional reservations of the products were allocated, and the reservation prices decided by the reservation pricing processing unit 103 (amount to be billed for the products under the provisional reservations). In the case of a hotel reservation, for instance, the recorded information is information identifying the reserved product, such as the name of the hotel, room type, check-in date and number of rooms, information regarding the reservation seeker, such as the name and contact address of the reservation seeker, and information on the reservation price based on the provisional reservation such as the accommodation charge.

Here, in a provisional reservation, the reservation allocation processing unit 104, at the point when the reservation fixing time designated/defined by the reservation seeker arrives, switches the data of the provisional reservation allocation data 32 to data of the fixed reservation allocation data 31, thereby fixing the reservation.

Further, a backup reservation list contained in the provisional reservation allocation data 32 is a list of all other reservable reservation alternatives contained in the reservation information of the reservation seeker and of the reservation prices decided by the reservation pricing processing unit 103 for these reservation alternatives. In the case where a later-arriving reservation seeker desires to purchase/reserve a provisionally reserved product even if by paying a higher price, the backup reservation list is used to replace the provisionally reserved product of the earlier reservation seeker with one of the backup reservations (as explained earlier, in this embodiment one backup reservation is selected in the order of preference designated by the reservation seeker) and fix the reservation of said provisionally reserved product reservation for the later-arriving reservation seeker.

In the backup reservation product data 33 there is recorded information, with respect to the provisional reservation allocations, identifying products allocated as backup reservations that have not yet been fixedly reserved or provisionally reserved (number of products in stock, etc.), and information regarding all provisional reservations provisionally reserving these products. That is, the information on the products allocated as backup reservations is associated with the information on provisionally reserved products that are the premise of backup reservations and, in addition, is associated with information as to whether or not they are fixedly reserved.

Therefore, in a case where an associated provisionally reserved product comes to be fixedly reserved for a later-arriving reservation seeker, a product among the backup reservations that is not under another provisional reservation or fixed reservation is selected in the foregoing manner and switched to the provisional reservation. That is, a provisional reservation is the reserved product that may come to be fixedly reserved by a later-arriving reservation seeker, and when the provisional reservation is fixed as a reservation for someone else, a backup reservation is raised to the status of the provisional reservation.

In the unreserved product data 34 there is recorded data indicating information identifying those among the products which have not yet allocated as fixed reservation, provisional reservation or backup reservation (number of products in stock, etc.).

The flow of processing will now be concretely explained for when the reservation seeker transmits the desired reservation information 20 from the reservation terminal 11 through the communications network 12 to the reservation server 10 to make a reservation registration in the system and the reservation server 10 conducts reservation processing.

Figure 4:
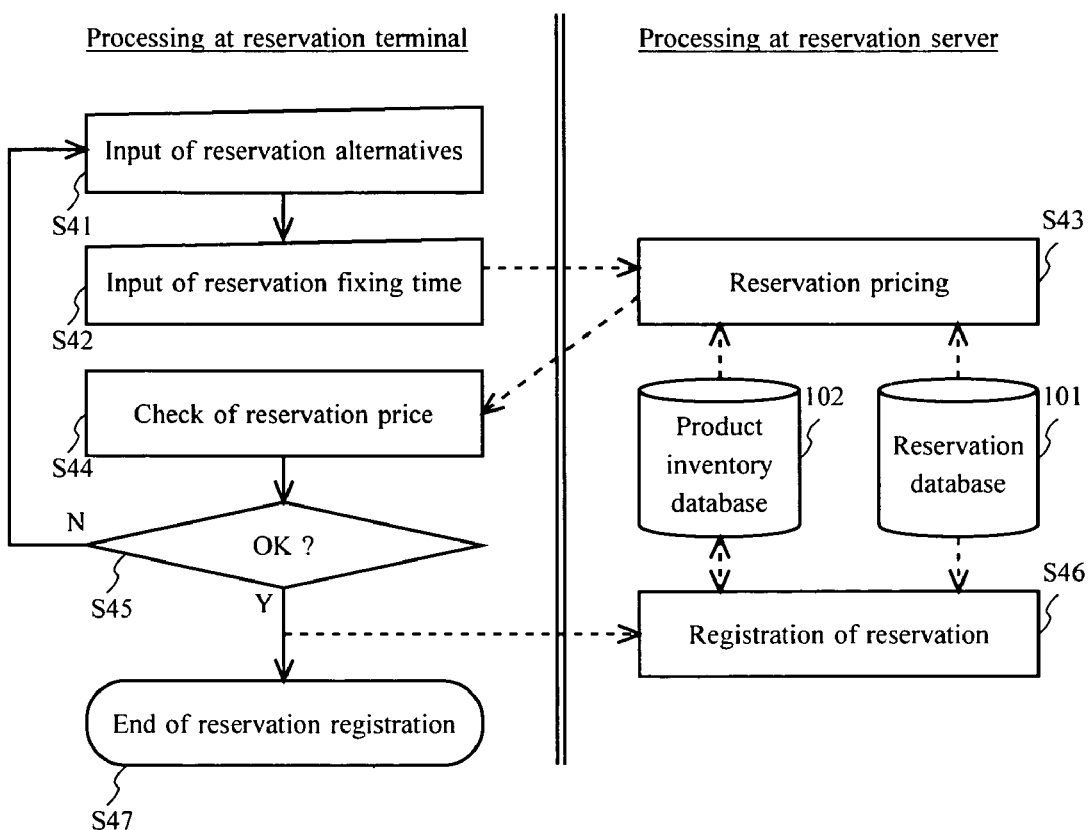
FIG. 4 is a flowchart for explaining in overview reservation processing that proceeds with transmit/receive of data conducted between reservation terminals and a reservation server.

FIG. 4 is a flowchart for explaining in overview reservation processing that proceeds with transmit/receive of data conducted between the reservation terminal 11 and the reservation server 10.

The reserver utilizes the GUI (Graphic User Interfaces) input/output screen of the reservation terminal 11 to input reservation alternatives information (step S41).

In this reservation alternatives input, the reservation seeker designates the products he or she wants to reserve, and at this time the reservation seeker designates a plurality of reservation alternatives giving their order of preference (preference order).

Next, the reservation seeker utilizes the GUI input/output screen of the reservation terminal 11 in accordance with the guide thereof to designate the desired time for fixing the reservation as the reservation fixing time (step S42).

The desired reservation information input via the reservation terminal 11 and containing the reservation alternatives and the reservation fixing time (desired reservation time) is then transmitted through the communications network 12 to the reservation server 10.

In the reservation server 10, when the desired reservation information input via the reservation terminal 11 and containing the reservation alternatives and the reservation fixing time is received via the communications network 12, the received desired reservation information of the individual reservation seekers is subjected to reservation price calculation processing, taking into account the desired reservation information in the reservation database 101 that was previously transmitted by a plurality of reservation seekers and tabulated, and the data in the product inventory database 102 (step S43).

As explained later, in this reservation system, up to the arrival of the reservation fixing time, the reservation seeker is not fixedly allocated a provisional reservation by the processing of the reservation allocation processing unit 104 of the reservation server 10 and, depending on the situation regarding subsequent reservation requests of later-arriving reservation seekers, there may be cases of automatic switching to another reservation contained among the reservation alternatives.

Therefore, in accordance with the processing in the reservation server 10 up to the reservation fixing time, the reservation pricing processing unit 103, taking into consideration the input reservation fixing times (times to when the reservations are granted) and number of reservation alternatives, reduces the reservation prices for reservation seekers who accept the uncertainty associated with reservation adjustment, thereby allocating provisional reservation prices that are lower than those to reservation seekers who are in a hurry to have their reservations fixed. That is, provisional reservation prices are reduced with increasing number of reservation alternatives and/or provisional reservation prices are reduced with longer reservation fixing time.

The reservation prices are calculated in accordance with the desired reservation information by the reservation price calculation processing in the reservation server 10 (step S43) and transmitted to the reservation terminals 11 to present the reservation seekers with all reservation alternatives for which reservation acceptance is possible, with one of the reservation alternatives (in this embodiment, the topmost one in the preference order) allocated a provisional reservation and all of the other reservable reservation alternatives allocated backup reservations.

Each individual reservation seeker checks the reservation price displayed on the display of the reservation terminal 11 (step S44), and if there is a reservation choice whose reservation price is too high at this time (step S45), processing for amending the desired reservation information is repeated starting with the desired reservation information input processing.

In this case, regarding the reservation choice whose price is too high, the reservation seeker can utilize the GUI of the reservation terminal 11 to delete this reservation choice. Further, as explained later, it is possible to lower the provisional reservation prices of all reservation alternatives by deferring the reservation fixing time by which the reservation is to be decided and having the reservation server 10 carry out the reservation price calculation processing again.

However, when deleting a reservation choice, the reservation seeker needs to take note of the fact that in accordance with the reservation price calculation processing mentioned earlier the reservation prices of all remaining reservation choices many increase.

When, as a result of adjusting the reservation alternatives and the reservation fixing time a number of times in this manner, the reservation seeker judges that the reservation prices of all reservation alternatives are acceptable, or when he or she decides any among the reservation alternatives whose reservation prices have been decided is acceptable as the final fixed reservation allocated to the reservation seeker at the reservation fixing time (step S45), the reservation information is transmitted from the reservation terminal 11 through the communications network 12 to the reservation server 10.

In the reservation server 10, registration processing of the provisional reservations and backup reservations is conducted based on the reservation information transmitted from the reservation terminal 11 (step S46), which completes the reservation registration processing.

Subsequently, the provisional reservation data contained in the provisional reservation allocation data 32 of the product inventory database 102 is switched to a fixed reservation at the point when the reservation fixing time designated in the reservation information arrives, processing is conducted for deleting data from any provisional reservation list of an backup reservation in the backup reservation list, information to the effect that the provisional reservation has been fixed (fixed reservation information) is transmitted from the reservation server 10 to the reservation terminal 11, and, at the reservation terminal 11, the reservation seeker is presented with a screen display or the like to the effect that the provisional reservation was made a fixed reservation. Note that, as explained later, this provisional reservation fixing processing is executed by the reservation allocation processing unit 104 of the reservation server 10 taking into account data of the reservation database 101 and product inventory database 102.

FIGS. 9 to 12 show one example of the screens displayed on the GUI (input/output screen) of the reservation terminal 11 during the aforesaid reservation processing operation.

When the reservation terminal 11 accesses the reservation server 10 via the communications network 12, then, taking hotel reservation as an example, a TOP screen 90 like that shown in FIG. 9 is displayed on the input/output screen of the reservation terminal 11, the reservation seeker enters in the window 91 the name or location of the hotel at which accommodation is desired, room type, check-in date, number of nights, number of rooms, price range and other information required for reservation and clicks the Search button 92 to transmit the input information required for reservation from the reservation terminal 11 to the reservation server 10.

Then, upon receiving the information required for reservation, the product inventory database 102 in the reservation server 10 extracts product information matching the received information and sends it back to the reservation terminal 11 to list the reservable product data on the input/output screen of the reservation terminal 11.

Note that this reservable product information contains information on products that have already been provisionally reserved and the reservation seeker can also obtain a fixed reservation for such provisionally reserved products by means of a later-arriving reservation provided that he or she accepts a premium price.

The reservation seeker can, by selecting the tabs 111, 112, switch the product information list displayed on the input/output screen of the reservation terminal 11 between a "Designated Reservation" screen 110 like that of FIG. 10 for immediately fixing the reservation and a "Discounted Reservation" screen 120 like that of FIG. 11 for making a provisional reservation.

The "Designated Reservation" screen 110 shown in FIG. 10 displays a list 113 including not only the information identifying reservable products received from the reservation server 10 (name of hotel, room type, length of stay) but also the price of the products (list price:regular price) and the discounted price in the case where the product is designated at this time (designated reservation price). When the reservation seeker confirms the designated reservation prices for each item of the displayed product information and agrees to reserve and selects the desired products in the list 113 by clicking the Reserve button 114, the information regarding the selected products (i.e., the reservation information) is transmitted from the reservation terminal 11 to the reservation server 10, where the reservation allocation processing unit 104 enters the received reservation information together with the reservation seeker information as the fixed reservation allocation data 31.

The designated reservation price is a discounted price set beforehand in light of the balance between product demand and supply. Therefore, when the reservation desired to be fixed is made at that time, the designated reservation price is applied.

Here, the reservation method that tries to confirm a later-arriving reservation for a product that has already been provisionally reserved by an earlier-arriving reservation is one form of designated reservation, so that information on products already provisionally reserved are displayed in the list 113 to enable a later-arriving reserver to confirm an already provisionally reserved product as his or her own reserved product through a later-arriving reservation made at that time point.

The designated reservation sale prices for such already provisionally reserved products are premium prices set higher than the prices of unreserved products and these premium designated reservation prices are displayed for the products concerned in the list 113. In the example shown in FIG. 10, "B Hotel, Single A" in the list 113 is a provisionally reserved product shown to be set at a premium designated reservation price (8,000) higher than the regular price (7,000).

Note that the premium designated reservation price need not necessarily be more expensive than the regular price and suffices to be an increased price higher than its discounted price as an unreserved product and can be set as desired in the light of system operation. Further, the provisionally reserved product information in the list 113 is preferably displayed in a manner distinguishable from the unreserved products by, for example, displaying it with highlighting, in a different font color or affixed with a mark.

On the other hand, in the "Discounted Reservation" screen 120 shown in FIG. 11 displays not only the information identifying reservable products received from the reservation server 10 (name of hotel, room type, length of stay) but also a list including the prices of the products (regular prices), the discounted prices in the case where the products are designated/reserved at the current time (designated reservation prices), and the special discounted prices further reduced in the case of provisionally reserving the products (discounted provisional reservation prices). Note that at this time point the discounted provisional reservation price is displayed as a tentative price that, as explained later, is renewed by price calculation processing conducted by the reservation server 10.

This screen 120 has a selected list 115 displaying information regarding products the reservation seeker selected for alternative provisional reservations and an unselected list 116 displaying information regarding products not selected for provisional reservation, and the product information can be freely interchanged between the selection list 115 and the unselected list 116 by clicking the Cancel selection button 117 and Select button 118. The screen 120 is further provided with a bar 119 into which the reservation seeker enters the date by which he or she wants the provisional reservation fixed as a fixed reservation, and the reservation fixing date entered in the bar 119 is included in the reservation information as the reservation fixing date.

Since processing for further provisionally reserving an already provisionally reserved product based on later-arriving reservation information is not allowed, information on provisionally reserved products is omitted and not shown in the lists 115, 116 displaying provisionally reservable choices. For example, the provisionally reserved product "B Hotel, Single A" displayed in FIG. 10 is not displayed in the discounted reservation screen 120 for making a provisional reservation.

Further, since the topmost product information in the selected list 115 is given a provisional reservation allocation and the other product information items in the selected list 115 are given backup reservation allocations, the Select preference order button 121 for changing the order of the selected list 115 is provided in the screen 120.

Further, a Discounted reservation button 122 is provided in the screen 120, and clicking the Discounted reservation button 122 transmits the information relating to the products contained in the selected list 115 (i.e., reservation information containing the preference order) from the reservation terminal 11 to the reservation server 10, where the reservation pricing processing unit 103 carries out price calculation processing on the received reservation information (i.e., the selected products) and sends the calculated discounted provisional reservation prices back to the reservation terminal 11.

Figure 12:
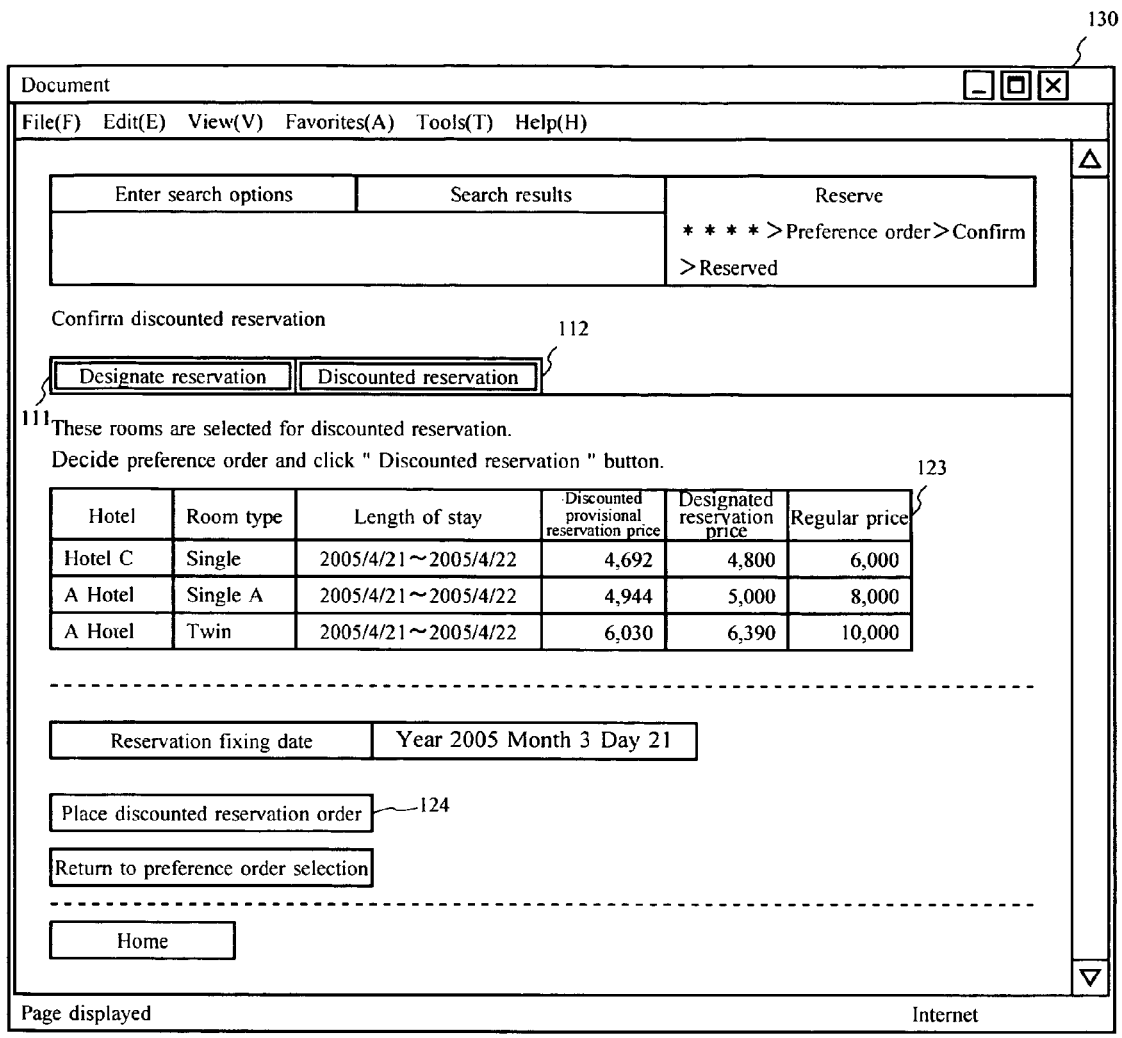
FIG. 12 is a diagram for explaining an example of reservation terminal screen display.

As shown in FIG. 12, in the reservation terminal 11 receiving the reply from the reservation server 10, the confirmation information 130 on the products selected for provisional reservation is displayed on the input/output screen, wherein a list 123 of the products selected for provisional reservation is displayed.

The list 123 displays a list including not only the information identifying the products selected earlier for provisional reservation (name of hotel, room type, length of stay) but also the prices of the products (regular prices), the discounted prices in the case where the products are designated/reserved at the current time (designated reservation prices), and the further reduced fixed discounted prices in the case of provisionally reserving the products (discounted provisional reservation prices).

When the reservation seeker accepts the list 123 and clicks a Place discounted reservation order button 124 provided in the confirmation information 130, the information regarding the selected product (i.e., the reservation information) is transmitted from the reservation terminal 11 to the reservation server 10, where the reservation allocation processing unit 104 conducts provisional reservation related processing on the received reservation information and enters it together with the reservation seeker information in the provisional reservation allocation data 32 and backup reservation product data 33.

This display of a list of the special discounted prices (discounted provisional reservation prices) that are further reduced from the standard discounted prices makes it possible to motivate the reservation seeker to make a provisional reservation (the aforesaid discounted reservation) instead of a fixed reservation (the aforesaid designated reservation), so that on the side of the business operation it is possible to exploit the ambiguity (or replaceablity) of provisional reservations to allocate reservations for products of limited number to more reservation seekers.

Further, the fact that the reservation server 10 conducts discounted price calculation processing each instance in the foregoing manner makes it possible to offer reservation seekers optimum discounted prices in response to the ever-changing product inventory and remaining sale period.

Next, explanation will be made regarding the processing that the reservation pricing processing unit 103 and reservation allocation processing unit 104 of the reservation server 10 perform with reference to the data of the reservation database 101 and product inventory database 102.

Figure 5:
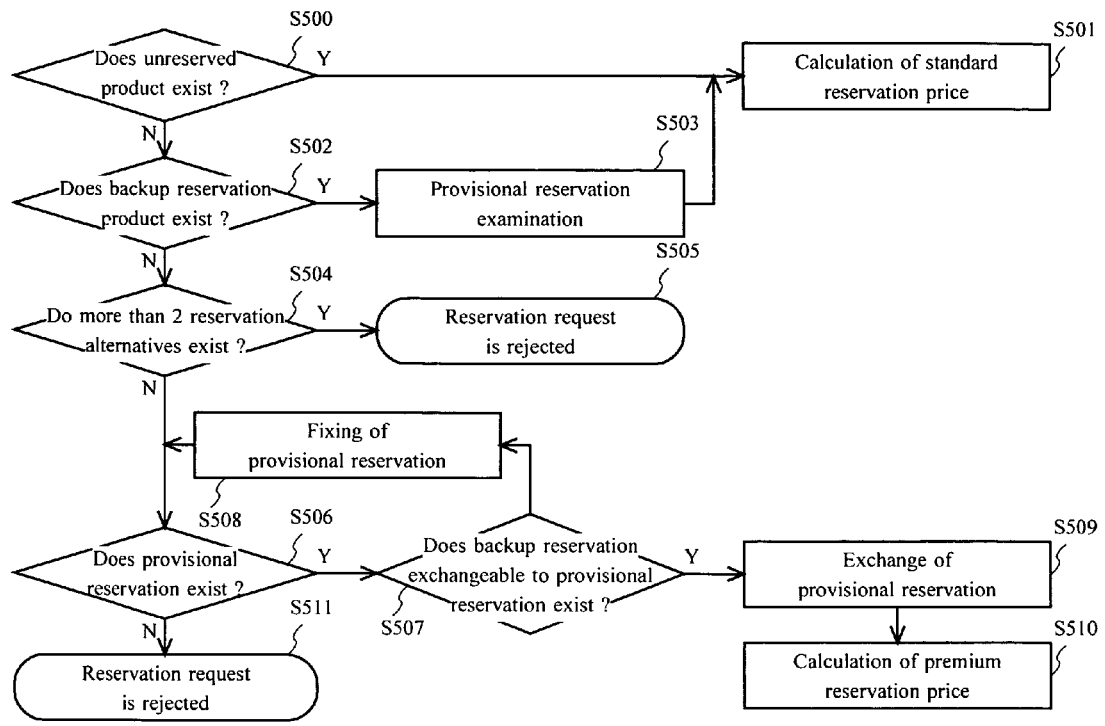
FIG. 5 is a flowchart showing a reservation pricing procedure.

This processing is executed in the reservation server 10 as the aforesaid processing of step S43 and processing of step S46, respectively. FIG. 5 is a flowchart showing the processing procedure of reservation pricing processing and reservation allocation processing.

The procedure for deciding reservation prices and reservation allocations with respect to the individual reservation alternatives entered by a reservation seeker will be concretely explained with reference to FIG. 5.

In the reservation pricing processing performed by the reservation pricing processing unit 103, timely and appropriate reservation prices are decided for the products among the reservation alternatives submitted (transmitted) by the reservation seekers, taking into account the reservation acceptance situation. And simultaneously, as regards the reservation allocations of earlier-arriving reservers, the reservation allocation processing unit 104 conducts processing in accordance with the circumstances for switching provisional reservations to fixed reservations and switching (upgrading) other backup reservations to provisional reservations.

However, the switching of reservation allocations carried out here by the reservation allocation processing unit 104 is strictly for calculating reservation prices (step S43 in FIG. 4) and when an affirmative decision of the reservation seeker for the reservation prices (step S45 of FIG. 4) is not obtained, the reservation allocation must be restored to the condition before starting the reservation price calculation. At this stage, therefore, the reservation allocation processing unit 104 merely detects and stores in memory the reservation allocation switches found necessary and alters the content of the product inventory database 102 after the reservation seeker has checked the presented reservation prices and found them to be acceptable.

The reservation allocation processing unit 104 checks the products contained in the reservation alternatives of the reservation seeker, by referring to the product inventory database 102 and starting from the one of the reservation alternatives having the highest preference order, as to whether any unreserved product data 34 corresponding to the products exists (whether the unreserved product remaining inventory is 1 or greater) (step S500).

When an unreserved product exists, the reservation pricing processing unit 103 calculates the standard reservation price of the product at the time of reservation (step S501). An example of the method for calculating specific standard reservation prices (the designated reservation prices in FIGS. 10-12) will be explained later.

When there is no unreserved product, then with respect to the reservation alternatives it is determined with reference to product inventory database 102 whether products satisfying the reservation request are present among the already allocated backup reservations (step S502).

When a corresponding backup reservation product exists, the reservation allocation processing unit 104 examines the provisional reservation allocation data 32 contained in the provisional reservation list of the backup reservation product data 33 thereof, and when it has become impossible to satisfy the reservation conditions owing to depletion of the remaining inventory of the concerned backup reservation product, examines whether another reservable backup reservation product is present in the backup reservation list of the provisional reservation allocation data 32, and if no other reservable backup reservation is possessed, stores the need to switch the provisional reservation allocation to a fixed reservation allocation (step S503). That is, a situation is prevented from arising, with regard to an already existing provisional reservation, in which reservation cannot be fixed among either a product thereof allocated as a provisional reservation or products thereof allocated as backup reservations.

Subsequently, reservation pricing processing unit 103 calculates the standard reservation price of the backup reservation product concerned at the current time (step S501).

In the foregoing steps, when neither an unreserved product nor an backup reservation product meeting the conditions of the reservation choice exists, a check is made as to whether the reservation seeker has not just one reservation choice but also has another reservation choice (next one in the preference order) (step S504).

If the result is that the reservation seeker has another reservation choice, since this means that the reservation seeker has an alternative reservation option, the reservation allocation for the most preferred reservation choice is given up and the processing starting from step 500 is conducted with respect to the next choice (step S505). In the case shown in FIG. 2, for example, the reservation seeker has four reservation alternatives which in this embodiment are ranked in preference in the order of the choice list, so that when there is no unreserved product or alternatively reserved product corresponding to the "March 12, Single, Nonsmoking" room, which is the first reservation choice, reservation of that room is given up and the reservation processing moves forward with respect to the "March 12, Double, Nonsmoking" room that is the next reservation choice.

Note that, while not shown in FIG. 5, also in the case where the reservation seeker has other reservation alternatives, more varieties of possible reservation allocations can be sought out by advancing to the following step S506.

When the reservation seeker has no other reservation choices, since no alternative reservation options exist for the reservation seeker, the reservation system replaces the provisional reservation allocated to an earlier-arriving reserver with the reservable backup reservation in the backup reservation list that is highest in preference order, thus changing it to an backup reservation, and examines whether this makes it possible to reserve/allocate this reservation choice to a product already provisionally reserved by earlier-arriving reserver.

By this, cases emerge in which reservation allocation can be effected with respect to reservation requests of later-arriving reservations to which the conventional reservation systems could not respond because of reservations being already concluded. Further, as was pointed out earlier in the example of FIG. 10, even when a reservation seeker has a plurality of reservation alternatives, it is possible for the purpose of expanding the range of reservation choice selection to instruct the reservation system to seek out reservations from among the provisional reservations of earlier-arriving reservers.

First, with respect to the product of the reservation choice, it is checked by referring the product inventory database 102 whether there is an earlier-arriving reserver to whom the product was allocated as a provisional reservation, i.e., whether the provisional reservation allocation data 32 exists (step S506).

When no corresponding provisional reservation allocation exists, the reservation allocation with respect to this reservation choice is given up (step S511).

On the other hand, when a provisional reservation of the reservation choice product has been allocated to the earlier-arriving reserver concerned, a check is made with reference to the backup reservation list recorded in the provisional reservation allocation data 32 as to whether a reservable backup reservation exists (step S507). Specifically, when the backup reservation product data 33 exists in the product inventory database 102 and the remaining inventory of the product meets the reservation request of the reservation seeker, a backup reservation that can replace the provisional reservation exists.

If such an backup reservation should not exist, since this means that it is impossible to switch the provisional reservation allocation concerned to another product, the reservation allocation processing unit 104 switches the provisional reservation allocation to a fixed reservation allocation and updates the product inventory database 102 so as to prevent a situation in which the reserved product cannot be supplied to the earlier-arriving reserver concerned because the provisional reservation with respect to the earlier-arriving reserver (which is a provisional reservation not amenable to exchange with an backup reservation) comes to be allocated to the later-arriving reservation seeker (step S508).

When a reservable backup reservation is found in the backup reservation list recorded in the provisional reservation allocation data 32 of the earlier-arriving reservation seeker concerned, the reservation allocation processing unit 104 stores in memory that the provisional reservation of the earlier-arriving reserver recorded in said provisional reservation allocation data 32 in the product inventory database 102 is replaced with the reservable item in the backup reservation list that is highest in preference order (topmost one in the choice list) (step S509). That is, the product provisionally reserved to the earlier-arriving reservation seeker is yielded as a reservable choice for the later-arriving reservation seeker.

Subsequently, the reservation pricing processing unit 103 calculates for the product provisionally allocated to the earlier-arriving reserver (i.e., the product that the later-arriving reservation seeker wants to reserve) a premium reservation price to the reservation seeker that is higher than the standard reservation price (the designated reservation price in FIGS. 10-12) (step S510). As shown in FIG. 10, this premium reservation price is presented to the later-arriving reservation seeker as the premium designated reservation price and reservation fixing process is done based on acceptance of the price. An example of the method of calculating concrete premium reservation prices will be explained later.

The reservation pricing processing unit 103 decides reservation prices for the reservation choices of the reservation seeker by the foregoing procedure, but when there is a plurality of reservation alternatives and the reservation fixing time is set later than the current time, it is further necessary to calculate discounted reservation prices (discounted provisional reservation prices in FIGS. 11 and 12) and define them as reservation prices.

Figure 6:
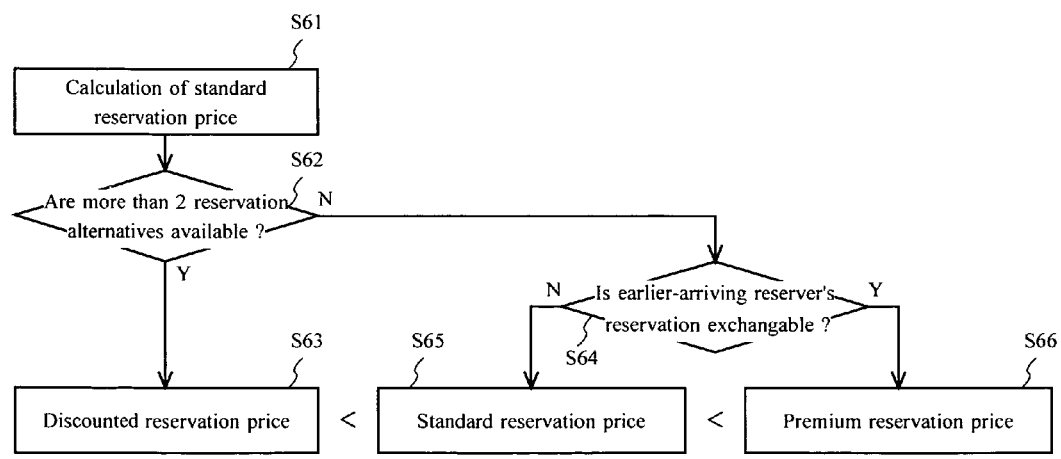
FIG. 6 is a flowchart showing a price adjustment processing procedure in reservation pricing processing.

An overview of the reservation price calculation processing will therefore be explained with reference to FIG. 6.

First, standard reservation prices are calculated for the reservable reservation choices among the reservation choices of the reservation seeker (step S61). Although so far as economically rational, the reservation price calculation can fundamentally be of any type, some examples thereof will be explained.

The number of reservable reservation choices the reservation seeker has is checked (step S61), and when it is a plural number (step S62), discounted reservation prices are calculated with respect to the standard reservation prices based on the number of reservable reservation alternatives and the time allowance up to the reservation seeker's reservation fixing time (step S63).

So far as economically rational, calculation of the discounted reservation prices can be of any type. As one example thereof, it can be formulated as shown below, where the discounted reservation price is designated as Pd, the standard reservation price as Ps, the number of reservable reservation alternatives as N, the total number of products as Nmax, the time allowance up to the reservation fixing time as T, and the reservation acceptance period as Tmax.

That is, the discounted reservation price Pd decreases with increasing number of reservation alternatives or longer time allowance, since the business operator is likely to receive more reservations accordingly. Note that the discounted reservation price Pd can be made to decrease based solely on the number of reservation alternatives or the time allowance.

$$Pd = Ps \times (1.0 - ((N-1)/Nmax) \times (T/Tmax)$$

In actual operations, however, attention must paid to the fact that from the viewpoint of increasing the likelihood of reservations resulting from switchover of reservations to later-arriving reservation seekers, the discounted reservation prices should be such as to motivate earlier-arriving reservers to designate a somewhat larger number of reservation alternatives. That is, while as an incentive for designating other reservation alternatives it is reasonable to offer some measure of discount to popular products that later-arriving reservation seeker will want to reserve even if by paying a high premium reservation price, the probability of the business operator incurring a loss is large when products unlikely to be popular are heavily discounted.

When there is only one reservable reservation choice, it is examined whether the reservation choice has already been provisionally reserved for an earlier-arriving reserver (step S64).

When the result is that a product not yet allocated a reservation is still available, the standard reservation price is presented to the reservation seeker as the reservation price (step 65). That is, the standard reservation price is set because the reservation seeker takes the ordinary reservation pattern of trying to reserve a single product.

In the case where the only reservable reservation choice has already been allocated to an earlier-arriving reserver as a provisional reservation, a premium reservation price is calculated as the reservation price (step 66). That is, the price is increased to make the later-arriving reserver pay for being permitted to appropriate an earlier-arriving provisional reservation as his or her own reservation.

So far as economically rational, calculation of the premium reservation prices can be of any type. As one example thereof, the premium price can, for example, be formulated as shown below, where the premium reservation price is designated as Pr and the standard reservation price as Ps.

$$Pr = Ps \times 1.2$$

However, the ×1.2 rate of the premium is only an example and in actual operation attention must paid to the fact that excessively high premium reservation prices become a major obstacle for later-arriving reservation seekers making reservations by reservation switching and another fact that popular products will be reserved even at somewhat high premium reservation prices.

An example of the method of calculating standard reservation prices will be explained in the following.

A business operator who offers products by reservation sets for each product a reservation acceptance start time, a reservation acceptance end time, an initial price, a maximum price, and a minimum price. The standard reservation price based on these set values varies with passage of time between the reservation acceptance start time and the reservation acceptance end time, and the number of reservations sold during this period.

The initial price here is the sale price at the start of product reservation. The maximum price is the upper limit of the sale price the business operator sets when the product inventory is low in order to pursue the maximum profit and also to encourage later reservers to switch their reservations to other products of abundant remaining inventories and low prices. The minimum price is the lower limit of the price for attracting reservations with a reduced price when reservation requests for the product are few and the probability of unsold stocks remaining is high.

Figure 7:
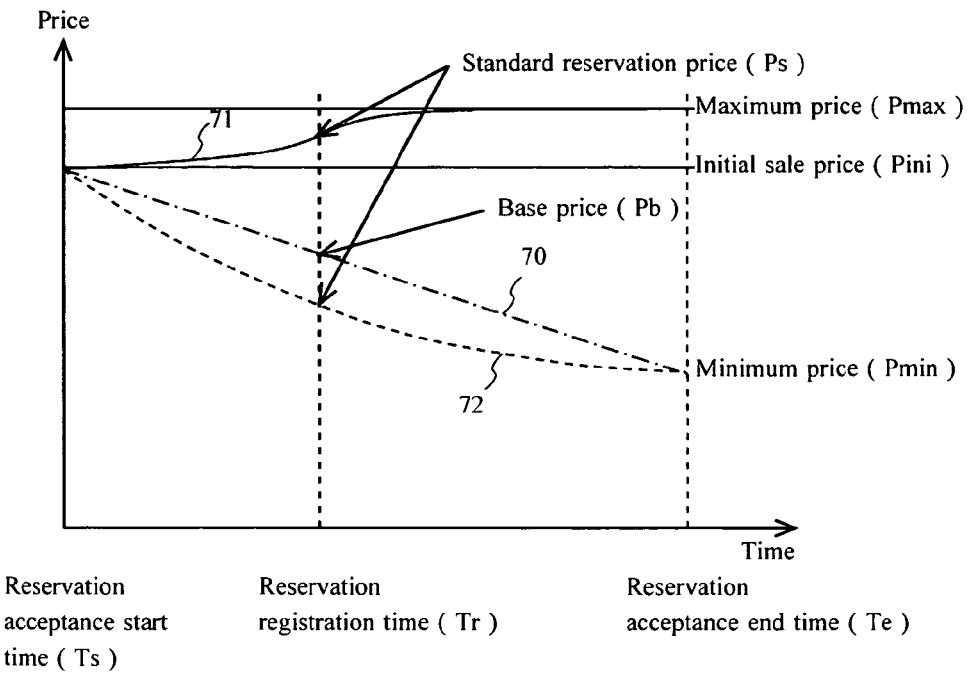
FIG. 7 is a graph for explaining standard reservation price transition over time.

FIG. 7 is a graph for explaining an example of standard reservation price transition over time.

In the equation below, Pmax stands for the maximum price, Pmin for the minimum price, Pmin for the initial price, Ts for the reservation acceptance start time, Te for the reservation acceptance end time and Tr for reserver's reservation registration time. Further, the base price Pb when a reservation is made at the reserver's reservation registration time Tr is defined as follows. Namely, in order to avoid unsold reservations as much as possible, the base price is lowered as the remaining time of up to the reservation acceptance end time becomes shorter.

Note that in the graph of FIG. 7 the base price Pb is represented by the alternate long and short dash line 70.

$$Pb = Pini - (Pini - Pmin) \times (Tr - Ts)/(Te - Ts)$$

The reservation pricing processing unit 103 reads the data of the unreserved product data field 34, backup reservation product data field 33, provisional reservation allocation data field 32 and fixed reservation allocation data field 31 from the product inventory database 102 and, with consideration to the ratio L of unreserved products and backup reservation allocations to all products, calculates the reservation-situation-adjusted standard reservation price Ps of the product concerned as follows.

$$L = (\text{Number of unreserved products} + \text{Number of backup reservation products})/\text{Total number of products}$$

$$Ps = Pb + (Pini - Pmin) \times (L - (Tr - Ts)/(Te - Ts))$$

$$Ps = \min(Pmax, \max(Pmin, Ps))$$

The calculated standard reservation price Ps is a price that reflects the remaining product inventory based on the reservation situation at the time of reservation acceptance in the base price Pb, and is set to a value equal to the maximum price Pmax when it exceeds the maximum price Pmax and to a value equal to the minimum price Pmin when it falls below the minimum price Pmin.

Therefore, the standard reservation price of a product having many reservation requests constantly follows a trajectory close to the maximum price Pmax, as indicated by the solid line 71 in FIG. 7, while that of a product which, to the contrary, has few reservation requests, follows a set price trajectory below the initial price Pini, as indicated by the dashed line 72 in FIG. 7.

The setting of the standard reservation prices in accordance with elapsed time and the trend in number of reservations in this manner enables the business operator conducting reservation-based sales to prevent product sellout and leftover unsold products and also to influence the reservations of reservation seekers so that they become evenly distributed over all products.

All of the foregoing equations are examples and the processing for calculating standard reservation price changes based on these time-course changes can be done using appropriate functions, tables and the like that take the individual business operator's past sales record into account.

Figure 8:
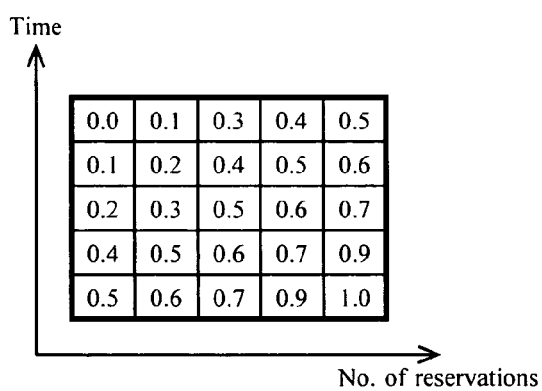
FIG. 8 is a diagram for explaining a method of adjusting the standard reservation price using a table.

FIG. 8 shows an example of a table layout for when calculating standard reservation prices using a table.

Where the maximum price is designated as Pmax, the minimum price is designated as Pmin, the standard reservation price is designated as Ps, and the table value corresponding to the elapsed time as of the reservation registration time point as $\alpha$, the standard reservation price is formulated as shown below. Note that the table values $\alpha$ can be successively set to appropriate values by applying a genetic algorithm or other such optimization methods to the business operator's past sales history data.

$$Ps = Pmin + \alpha \times (Pmax - Pmin)$$

As mentioned earlier, once reservation prices have been calculated by reservation pricing processing for all reservable reservation choices of a reservation seeker, the results are sent to the reservation terminal 11, whereupon the reserver checks the reservation prices (step S44 of FIG. 4) and judges whether they are acceptable (step S45 of FIG. 4).

If the reservation seeker finds the reservation prices of all reservation choices to be acceptable and decides that it does not matter which of the reservation choices whose reservation prices have been decided becomes the final fixed reservation allocated to the reservation seeker at the reservation fixing time, the confirmation data is transmitted from the reservation terminal 11 to the reservation server 10, and the reservation allocation processing unit 104 actually changes the reservation allocation with respect to required reservation allocation switching confirmed in steps S503, S509 of FIG. 5, updates the product inventory database 102, and terminates the reservation processing with respect to the reservation seeker.

Since a plurality of reservation alternatives were designated, at the reservation fixing time designated by the reservation seeker the reservation allocation processing unit 104, which clocks elapsed time, automatically changes the provisional reservation allocation of the reservation seeker to a fixed reservation allocation and moves it from the provisional reservation allocation data field 32 of the product inventory database 102 to the fixed reservation allocation data field 31 thereof.

If the reservation seeker checks the presented reservation prices (step S44 of FIG. 4) and finds that they are unacceptable (step S45 of FIG. 4), the reservation seeker either changes the reservation choices and checks the reservation prices again or breaks off the session.

Note that although equations for calculating the base price, the standard reservation price, the premium reservation price and the discounted reservation price were set out in the foregoing embodiment, these are all examples and it is possible to make the calculations by applying other equations of an economically rational nature. For example, although in the foregoing embodiment the base price is determined by linear interpolation of the initial price and minimum price at the reservation acceptance time, the interpolation does not need to be a linear function and absolutely the same application is possible so long as it is a monotonously deceasing function.

As explained in the foregoing, the present reservation system sets suitable prices for the reservations desired by reservation seekers in accordance with the remaining inventory of products for which reservations are desired and reserver flexibility regarding reservations (number of reservation alternatives and time allowance up to reservation decision). That is, low reservation prices are set for reservation seekers interested in products with large remaining inventory or who are highly flexible.

The tradeoff is that the final reservation allocation is not fixed until the reservation fixing time and the reservation seeker does not know which among the reservation alternatives it will be until the reservation fixing time arrives. Still, from the reservation seeker's standpoint, it is a relatively reliable reservation system because, differently from ordinary reservation systems utilizing auctions, a reservation seeker who allocates a plurality of reservation choices at the reservation registration time is guaranteed of being allocated a reservation from one of them without fail. Further, from the business operator's standpoint, there is the merit that the final reservation price is easier to control than in an auction system because the business operator can set the standard reservation price on its own.

Further, the reservation seeker may, by paying a premium reservation price, be able to reserve a product that would conventionally have been sold out and not been available for reservation, so that it is a highly convenient system for reservation seekers who require a specific product at the last moment.

Conventionally, in order to respond to such reservation seeker's demands, airline companies and other such business operators have used mathematically sophisticated and complex processing to decide product categorization, launch timing, and price and quantity adjustments. The present reservation system can achieve the same purpose by a method that is much simpler than such methods and, as such, is a practicable option available to small business operators who have heretofore not been able to respond to such demands.

In addition, a business operator who markets products by reservation not only can appropriately set product prices in light of the amount of demand for the products and the suppliable quantity thereof but can also engage in strategic price setting for increasing profits, while avoiding loss of sale opportunities and losses owing to product sellout, by discounting reservation prices in accordance with number of reservation alternatives and time allowance up to the desired reservation time and setting premium reservation prices aimed at allocating to later-arriving reservers reservations of earlier-arriving reservers that can be replaced with backup reservation requests.

The present invention can be applied to reservation-based sales of various products under time and volume constraints, such as hotel reservations and reservation-based ticket sales.

The reservation processing system according to the present invention can be applied as a reservation-based product sales system in cases where, in reservation-based sales of a plurality of products, distribution of demand is not uniform among the individual products, so that a mixture of products on which desire for reservations concentrates and products likely to remain as dead stock is apt to arise. In such a case, not only are prices set for the reservation seekers in accordance with passage of the reservation acceptance period and remaining product inventory but, in addition, discounted reservation prices are set in accordance with the reservation seekers' number of replaceable reservation alternatives and time allowance to fix reservation decision, and premium reservation prices are established for the purpose of replacing the reservations of earlier-arriving reservers and allocating reservations to later-arriving reservation seekers, whereby the reservation seekers can make reservations within the scope of their preferences at appropriate prices in accordance with their need for a reservation and the popularity of the product.

In addition, in these circumstances, the business operator who offers products by reservation not only can set prices in accordance with passage of the reservation acceptance period and remaining product inventory but, in addition, can set discounted reservation prices in accordance with the reservation seekers' number of replaceable reservation alternatives and time allowance to fix reservation decision, and establish premium reservation prices for the purpose of replacing the reservations of earlier-arriving reservers and allocating reservations to later-arriving reservation seekers, whereby it becomes possible to make adjustments so as to even out the load (reservation requests) on the products within the range of the replaceable choices and reservation allowance times set by the reservation seekers and thus expand profits by preventing sellout, leftover stock and the like.

The invention claimed is:

1. A reservation processing system comprising:
a reservation terminal for accepting and transmitting reservation information on a product purchase reservation from reservation information input by a first reservation seeker; and
a reservation server for conducting reservation acceptance processing based on the reservation seeker-input reservation information received from the reservation terminal, wherein
the reservation terminal is configured to accept and transmit to the reservation server the first reservation seeker-input reservation information containing a plurality of reservation alternatives designating products desired to be reserved and a reservation fixing time that designates a time limit for fixing the reservation, the reservation alternatives including a highest priority reservation alternative and a lowest priority reservation alternative, and at least one priority reservation alternative between the highest priority reservation alternative and the lowest priority reservation alternative, and wherein
the reservation server has a reservation allocation function to, based on the first reservation seeker-input reservation information received from the reservation terminal, allocate the highest priority reservation alternative as a provisional reservation that is a tentative reservation, allocate the lowest priority reservation alternative and the at least one priority reservation alternative between the highest priority reservation alternative and the lowest priority reservation alternative as backup reservations that are auxiliary tentative reservations, and when later-arriving reservation information from a second reservation seeker is received up to the reservation fixing time and meets a predetermined condition, the reservation server responds to the receiving of the later-arriving reservation information by allocating the provisional reservation as a reservation with respect to the later-arriving reservation information and changing one of the backup reservations to the provisional reservation.

2. The reservation processing system according to claim 1, wherein the reservation server has a reservation pricing function to calculate, with respect to first reservation seeker-input reservation information for a provisional reservation, a discounted reservation price in accordance with a number of reservation alternatives contained in the first reservation seeker-input reservation information.

3. The reservation processing system according to claim 1, wherein the reservation server has a reservation pricing function to calculate, with respect to the first reservation seeker-input reservation information for a provisional reservation, a discounted reservation price in accordance with a time allowance up to the reservation fixing time contained in the first reservation seeker-input reservation information.

4. The reservation processing system according to claim 2, wherein
the reservation pricing function calculates a premium reservation price with respect to the later-arriving reservation information, and
when the premium reservation price is accepted by the reservation seeker, the reservation allocation function, taking the fact that the premium reservation price was accepted by the second reservation seeker who input the later-arriving reservation information to mean that the predetermined condition has been met, allocates the provisional reservation as a reserved product with respect to the later-arriving reservation information and change one of the backup reservations to the provisional reservation.

5. A reservation processing system that conducts processing based on reservation information received from a reservation terminal for allocating one among the reservation alternatives contained in the reservation information as a provisional reservation that is a tentative reservation and further allocating the remaining choices among the reservation alternatives as backup reservations that are auxiliary tentative reservations, said reservation processing system comprising:

a product inventory database for managing a suppliable quantity of products offered by a business operator and a demanded quantity of products allocated to reservation seekers, a plurality of reservation terminals for accepting input of and transmitting reservation information containing a plurality of reservation alternatives designating products that reservation seekers desire to reserve and reservation fixing times that designate time limits for fixing the reservations, the reservation alternatives including a highest priority reservation alternative and a lowest priority reservation alternative, and at least one priority reservation alternative between the highest priority reservation alternative and the lowest priority reservation alternative, a reservation database for tabulating reservation alternatives of the reservation information transmitted from the plurality of reservation terminals, a reservation pricing unit, based on the reservation information, with respect to product prices established in view of the demanded quantity and the suppliable quantity of the products, configured to calculate discounted reservation prices with regard to the reservation information for the provisional reservations in accordance with a number of reservation alternatives and a time allowance up to reservation fixing and, with respect to later-arriving reservation information received up to the reservation fixing times, calculate premium reservation prices for cases where the provisionally reserved choices are allocated as reserved products with respect to the later- arriving reservation information, and a reservation allocation unit configured to transmit the calculated reservation prices back to the reservation terminals that transmitted reservation information and, when acceptance of the reservation price is obtained in response, the reservation allocation unit is configured to generate a provisional reservation and backup reservations and allocate the provisional reservation to the highest priority reservation alternative and allocate the backup reservations to the lowest priority reservation alternative and the at least one priority reservation alternative between the highest priority reservation alternative and the lowest priority reservation alternative, and, when, by the reservation fixing time, a reservation request is made by a later-arriving reservation seeker at the premium reservation price established by the reservation pricing unit, then, with respect to the provisional reservation allocation, the reservation allocation unit is configured to replace the provisional reservation allocation with one of the allocated backup reservations provided that a reservable backup reservation allocation exists, making the original provisional reservation allocation a reservation allocation of the later-arriving reservation seeker, and at the reservation fixing time making the provisional reservation allocation a fixed reservation with respect to the reservation seeker.

6. A reservation server that receives reservation information input by a first reservation seeker that contains a plurality of reservation alternatives designating products desired to be reserved and a reservation fixing time that designates a time limit for the reservation, the reservation alternatives including a highest priority reservation alternative and a lowest priority reservation alternative, and at least one priority reservation alternative between the highest priority reservation alternative and the lowest priority reservation alternative, and conducts reservation acceptance processing, said reservation server comprising:

a processor; and a computer readable medium storing a program, which when executed enables a reservation allocation function, based on the received reservation information, to allocate the highest priority reservation alternative as a provisional reservation that is a tentative reservation, allocates the lowest priority reservation alternative and the at least one priority reservation alternative between the highest priority reservation alternative and the lowest priority reservation alternative as backup reservations that are auxiliary tentative reservations, and the reservation allocation function being configured to receive later-arriving reservation information from a second reservation seeker, such that when the later-arriving reservation information is received up to the reservation fixing time, and the later-arriving reservation information meets a predetermined condition, the reservation allocation function is configured to respond to the later-arriving reservation information by allocating the provisional reservation as a reserved product with respect to the later-arriving reservation information and change one of backup reservations to the provisional reservation.

7. The reservation server according to claim 6, further comprising a reservation pricing function that, with respect to reservation information for a provisional reservation, calculates a discounted reservation price in accordance with the number of reservation alternatives contained in the reservation information and in accordance with the time allowance up to the reservation fixing time.

8. The reservation server according to claim 6, wherein the reservation pricing function calculates a premium reservation price with respect to the later-arriving reservation information, and the reservation allocation function, when the premium reservation price is accepted by the second reservation seeker who input the later-arriving reservation information, determines that the predetermined condition has been met, and allocates the provisional reservation to a reserved product with respect to the later-arriving reservation information and changes one of the backup reservations to the provisional reservation.

9. A reservation processing system comprising:

a reservation server that has a reservation allocation function to, based on received reservation information from a first reservation seeker, allocate highest priority reservation alternative as a provisional reservation that is a tentative reservation, allocate a lowest priority reservation alternative and the at least one priority reservation alternative between the highest priority reservation alternative and the lowest priority reservation alternative as backup reservations that are auxiliary tentative reservations, and when later-arriving reservation information from a second reservation seeker is received up to the reservation fixing time and meets a predetermined condition, the reservation allocation function responds to the later-arriving reservation information by allocating the provisional reservation as a reserved product with respect to the later-arriving reservation information and changing one of backup reservations to the provisional reservation; and a reservation terminal comprising a processor, and a computer readable medium storing a program, which when executed enables an acceptance means to accept reservation information input by the first reservation seeker, the reservation information from the first reservation seeker containing a plurality of reservation alternatives designating products desired to be reserved and a reservation fixing time that designates a time limit for fixing the reservation, and a transmission means to transmit the reservation information from the first reservation seeker to the reservation server.

10. A reservation processing system comprising:
a reservation server that has a reservation allocation function to, based on reservation information from a first reservation seeker, allocate a highest priority reservation alternative as a provisional reservation that is a tentative reservation, allocate a lowest priority alternative and the at least one priority reservation alternative between the highest priority reservation alternative and the lowest priority reservation alternative among the reservation alternatives as backup reservations that are auxiliary tentative reservations, and when later-arriving reservation information from a second reservation seeker is received up to the reservation fixing time and meets a predetermined condition, the reservation allocation function responds to the later-arriving reservation information by allocating the provisional reservation to a reserved product with respect to the later-arriving reservation information and changing one of backup reservations to the provisional reservation; and
a reservation terminal comprising
a processor, and
a computer readable medium storing a program, which when executed enables display means to accept input from the first reservation seeker of reservation information, the reservation information from the first reservation seeker containing a plurality of reservation alternatives designating products desired to be reserved and a reservation fixing time that designates a time limit for fixing the reservation, and a transmission means to transmit the reservation information from the first reservation seeker to the reservation server.

11. A computer program product embodied on a non-transitory computer readable medium for use by a computer to configure a reservation server that receives reservation information input by a first reservation seeker that contains a plurality of reservation alternatives designating products desired to be reserved and a reservation fixing time that designates a time limit for fixing the reservation, and conducts reservation acceptance processing, said computer program product comprising an instruction that causes the computer to:
create in the computer a reservation allocation function to, based on received reservation information, allocate highest priority reservation alternative as a provisional reservation that is a tentative reservation, allocate a lowest priority reservation alternative and at least one priority reservation alternative between the highest priority reservation alternative and the lowest priority reservation alternative as backup reservations that are auxiliary tentative reservations, and when later-arriving reservation information from a second reservation seeker is received up to the reservation fixing time and meets a predetermined condition, the reservation allocation function responds to the later-arriving reservation information by allocating the provisional reservation to a reserved product with respect to the later-arriving reservation information and changing one of backup reservations to the provisional reservation.

12. The computer program product according to claim 11, wherein the instruction causes the computer to
create in the computer a reservation pricing function to calculate, with respect to reservation information for the provisional reservation, a discounted reservation price in accordance with the number of reservation alternatives contained in the reservation information and in accordance with the time allowance up to the reservation fixing time contained in the reservation information.

13. The computer program product according to claim 11, wherein
the reservation pricing function calculates a premium reservation price with respect to later-arriving reservation information, and
the reservation allocation function, when the premium reservation price is accepted by the reservation seeker who input the later-arriving reservation information, determines that the predetermined condition has been met, and allocates the provisional reservation to a reserved product with respect to the later-arriving reservation information and changes one of backup reservations to the provisional reservation.

14. A reservation processing method implemented by a reservation processing system equipped with a reservation terminal for accepting and transmitting the reservation information on a product purchase reservation from a first reservation seeker and a reservation server for conducting reservation acceptance processing based on the reservation information from the first reservation seeker received from the reservation terminal, said reservation processing comprising:
accepting and transmitting, with the reservation terminal, the reservation server first reservation seeker-input reservation information containing a plurality of reservation alternatives designating products desired to be reserved and a reservation fixing time that designates a time limit for fixing the reservation, the reservation alternatives including a highest priority reservation alternative and a lowest priority reservation alternative, and at least one priority reservation alternative between the highest priority reservation alternative and the lowest priority reservation alternative, and
allocating, with the reservation server, based on the first reservation seeker-input reservation information received from the reservation terminal, the highest priority reservation alternative to a provisional reservation that is a tentative reservation, allocating the lowest priority reservation alternative and at least one priority reservation alternative between the highest priority reservation alternative and the lowest priority reservation alternative to backup reservations that are auxiliary tentative reservations, and when later-arriving reservation information from a second reservation seeker is received up to the reservation fixing time and meets a predetermined condition, responding to the later-arriving reservation information by allocating the provisional reservation as a reserved product with respect to the later-arriving reservation information and changing one of backup reservations to the provisional reservation.

15. A reservation processing method according to claim 14, wherein
with respect to reservation information for a provisional reservation, the reservation server calculates a discounted reservation price in accordance with the number of reservation alternatives contained in the first reservation seeker-input reservation information and in accordance with the time allowance up to the reservation fixing time contained in the first reservation seeker-input reservation information.

16. A reservation processing method according to claim 14, wherein the reservation server calculates a premium reservation price with respect to later-arriving reservation information and, when the premium reservation price is accepted by the second reservation seeker who input the later-arriving reservation information, determines that the predetermined condition has been met, allocates the provisional reservation with respect to the earlier-arriving reservation information as a reserved product with respect to the later-arriving reservation information and changes one of backup reservations to the provisional reservation.

17. A reservation processing method comprising providing a reservation system, said reservation system comprising, in interconnection with a communications network, a plurality of reservation terminals, a product inventory database, a reservation database and a reservation server having reservation pricing means and reservation allocation means, said reservation allocation means being implemented to conduct processing for, based on reservation information received from the reservation terminals, allocating a highest priority reservation alternative contained in the reservation information as a provisional reservation that is a tentative reservation and further allocating a lowest priority reservation alternative and at least one priority reservation alternative between the highest priority reservation alternative and the lowest priority reservation alternative alternatives as backup reservations that are auxiliary tentative reservations, managing, with the product inventory database, a suppliable quantity of products offered by a business operator and a demanded quantity of products allocated to reservation seekers, upon the reservation allocation means having received via the communications network reservation information transmitted from the plurality of reservation terminals and containing reservation alternatives designating products that reservation seekers desire to reserve and reservation fixing times that designate time limits for fixing the reservations, tabulating, with the reservation database, the reservation alternatives of the reservation information transmitted from the plurality of reservation terminals, based on the reservation alternatives of the reservation information, calculating, with the reservation pricing means, with respect to product prices suitably established in view of the demanded quantity and the suppliable quantity of the products discounted reservation prices with regard to the reservation information for the provisional reservations in accordance with the number of reservation alternatives and the time allowance up to reservation fixing and, when later-arriving reservation information is received up to the reservation fixing times, calculating premium reservation prices for cases where the provisional reservations are allocated to reserved products with respect to the later-arriving reservation information, and transmitting, with the reservation allocation means, the calculated reservation prices back to the reservation terminals that transmitted reservation information and, in a case where acceptance of the reservation price is obtained in response, the reservation allocation means fixes the allocated reservation if the number of reservation alternatives that can be reserved is one, allocates a provisional reservation to one of the reservation alternatives and allocates backup reservations to the other reservation alternatives if the number of reservation alternatives that can be reserved is greater than one, and, in a case where there was, by the reservation fixing time, a reservation request made by a later-arriving reservation seeker at the premium reservation price established by the reservation pricing means, then, with respect to the provisional reservation allocation, the reservation allocation means replaces the provisional reservation allocation with one of the backup reservation allocations provided that a reservable backup reservation allocation exists, makes the original provisional reservation allocation a reservation allocation of the later-arriving reservation seeker, and at the reservation fixing time makes the provisional reservation allocation a fixed reservation with respect to the reservation seeker.

* * * * *